Sept. 25, 1962 P. M. DAVIES 3,056,041

CRYOGENIC SHIFT REGISTER UTILIZING CURRENT SOURCE FEEDING SERIES-CONNECTED STAGE-CHAIN WITH PARALLEL PATHS IN EACH STAGE

Filed Jan. 13, 1961

3 Sheets-Sheet 1

PAUL M. DAVIES
INVENTOR.

BY Gerald Singer
AGENT.
Albert Rosen
ATTORNEY.

Sept. 25, 1962 P. M. DAVIES 3,056,041

CRYOGENIC SHIFT REGISTER UTILIZING CURRENT SOURCE FEEDING SERIES-CONNECTED STAGE-CHAIN WITH PARALLEL PATHS IN EACH STAGE

Filed Jan. 13, 1961

3 Sheets-Sheet 2

PAUL M. DAVIES
INVENTOR.

BY Gerald Feigy
AGENT.

Albert Rosen
ATTORNEY.

Sept. 25, 1962

P. M. DAVIES 3,056,041

CRYOGENIC SHIFT REGISTER UTILIZING CURRENT SOURCE FEEDING SERIES-CONNECTED STAGE-CHAIN WITH PARALLEL PATHS IN EACH STAGE

Filed Jan. 13, 1961

3 Sheets-Sheet 3

PAUL M. DAVIES
INVENTOR.

BY Gerald Seigel
AGENT.

Albert Rosen
ATTORNEY.

3,056,041

CRYOGENIC SHIFT REGISTER UTILIZING CURRENT SOURCE FEEDING SERIES-CONNECTED STAGE-CHAIN WITH PARALLEL PATHS IN EACH STAGE

Paul M. Davies, Manhattan Beach, Calif., assignor to Space Technology Laboratories, Inc., Los Angeles, Calif., a corporation of Delaware Filed Jan. 13, 1961, Ser. No. 82,429
7 Claims. (Cl. 307—88.5)

This invention relates generally to shift registers and more particularly to a superconductive shift register employing a pair of phased clock pulses for controlling the writing of information into, the shifting of information within, and the reading of information from the register.

In the design of automatic digital computers, the basic unit of information that has developed and received recognition is the binary digit or bit. In the binary system there are only two states that each digit can assume, 1 and 0. The placement of a group consisting of a predetermined number of bits is usually called a machine word or simply a word. In a computer application using serial storage, information is handled sequentially, in which case time is one of the coordinates used to locate any given bit or word. A shift register used in such a computer application is a serial device in which information is handled sequentially, bit by bit. A shift register is usually applicable to a serial operation in which the information moves through the machine alone one line or channel at any given time. This, of course, is opposed to a parallel operation in which the information moves through the machine on two or more lines or channels simultaneously. Shift registers have many uses in computers, for example they may be used to receive the information to be operated upon or receive the result of information for storage preparatory to a new step in the computing chain. The information contained in a shift register may be moved or shifted left or right, depending on the operation to be performed. For example, a binary number may be multiplied or divided by a power of two, by shifting the number left or right, respectively.

In the past, most shift registers have been constructed to use a single shifting pulse or signal. For certain applications, a single pulse shift register is satisfactory and has great utility; however, when considering the problems inherent in the cryogenic art, and particularly in cryogenic computers, it was discovered that so-called rat races and instabilities of the cryogenic devices themselves seriously affected the reliability and operation of the shift register. In the present invention shifting is accomplished in two steps and as the direct result of a pair of independent and nonoverlapping control pulses termed a T1 shift and a T2 shift. A shift register constructed according to the principles of this invention will comprise a plurality of bit handling mechanisms called stages and in which each stage is divided into two equal portions called an A portion and a B portion. In the present invention a T1 shift allows information to be fed into the A portion of the first stage and also shifts information contained in the B portion of every stage into the following A portion of the next stage. Subsequent to this, a T2 shift causes the shifting of information from the A portion of every stage into the B portion of the same stage. It will be appreciated, therefore, that a combination of both the T1 shift and the T2 shift is needed to successfully cause the shifting of a single bit of information. For sequential and high speed operation the T1 shift will consist of a series of square pulses having an ON time that is less than the OFF time. In a similar manner, the T2 pulses will consist of a series of substantially identical square pulses also having an ON time that is less than the OFF time. The phasing of the T1 and T2 pulses is such that the T2 pulses are ON when the T1 pulses are OFF, and similarly when the T1 pulses are ON the T2 pulses are OFF. In the present cryogenic application, the amplitude must be sufficient to cause switching of the individual device from a superconductive state to a resistive state.

The cryogenic shift register is comprised of a plurality of identical stages each arranged to handle a single bit of information. Each stage in turn may be considered to have two parts, an A part and a B part, each substantially independent of the other and independently controlled. Each stage is by itself symmetrical in that there is a left branch and a right branch, and the information contained in any stage or part of a stage is a function of the state of the defined right and left branches. For example, a convention may be chosen which states that current passing through the left branch will indicate a binary 0, whereas current passing through the right branch will represent a binary 1. The information contained in the register will therefore be a function of the right and left components and whether they contain current. The present invention is concerned with the mechanization of the disclosed superconductive shift register in which a first train of pulses will shift information from the A portion of each state into the B portion of the same state, and a second train of pulses which will shift the information from the B portion of every stage into the A portion of the next stage. Stated in another way, the second train of pulses shift information from the B portion of every even numbered memory cell into the A portion of the next higher order numbered memory cell and shift information from the B portion of every order numbered memory cell into the A portion of the next higher even numbered memory cell.

Further objects and advantages of this invention will be made more apparent as the description progresses, reference now being made to the accompanying drawings wherein.

Since the use of a superconductive shift register is predicated upon certain effects peculiar to the phenomenon of superconductivity, these effects will be discussed in connection with the description of the invention.

Figure 1:
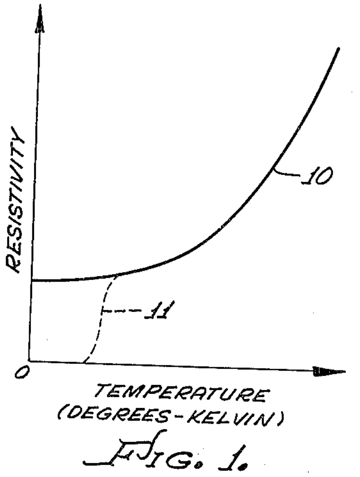
FIG. 1 is a graph illustrating the abrupt disappearance of resistance of a superconductor as it approaches absolute zero.

Referring now to FIG. 1, there is shown a graph 10 illustrating the classical concepts of reduced resistivity as the temperature approaches absolute zero. The dashed line 11 of curve 10 illustrates the abrupt vanishing of the resistivity of the material for that class of materials having the ability to become superconductors. Superconductivity as used in the present invention is the apparent disappearance of electrical resistance of temperatures close to absolute zero. In the study of classical electromagnetism it was expected and predicted that the resistance of an electrical conductor would decrease with a decrease in temperature. The theory indicated that an electric current through a conductor, which consists of the flow of free electrons through the crystal lattice of the molecules forming the conductor, would be affected by the thermal vibration of the atoms comprising the lattice structure. This seemed to indicate that at the higher temperatures the greater thermal activity would increase the probability of collisions between electrons, and hence result in a higher resistivity. Conversely, at the lower temperature it was expected that the lower thermal activity of the electrons would result in a lowering of the resistance until some finite value was reached. This expected finite value was thought to consist of collisions between the moving electrons forming the electric current flow with the substantially fixed and immobile electrons forming the lattice structure. In addition, it was expected that defects and impurities in the lattice structure would also tend to establish a finite resistance near absolute zero. The dashed line 11 is representative of mercury, since at 4.2 degrees absolute the electrical resistance of mercury is known to vanish without even the residual resistance as predicted by the classical theory. For those materials exhibiting superconductivity, the change between the normal conductive state and the superconductive state is very abrupt and occurs at a specific temperature which is different for different materials. The temperature at which the material changes state is termed the transition temperature and is generally only a few degrees above absolute zero. A discussion of the principles of superconductivity and a general listing of materials and compounds that exhibit the property of superconductivity may be found in a book entitled, "Superconductivity" by D. Schoenberg, Cambridge University Press, Cambridge, England, 1952. Certain materials capable of becoming superconductive and their transition temperatures are listed below:

| | Kelvin degree |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |

The above-listed transition temperatures apply only when the materials are in a substantially zero magnetic field.

Figure 2:
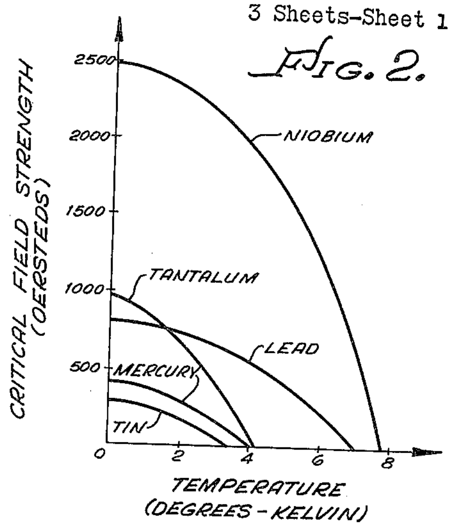
FIG. 2 is a graph illustrating the critical field strength of a number of superconductors as a function of temperature.

Referring now to FIG. 2, there is illustrated a series of curves indicating the effect of a magnetic field on the transition temperatures for the materials of niobium, lead, tantalum, mercury, and tin. In each material the field strength required to switch the state of the conductor varies with temperature within the range in which the material is superconductive. For example, the metal niobium has a transition temperature of 8 degrees at zero field strength, a critical field strength of 2000 oersteds at 4.2 degrees, and a critical field strength of 2400 oersteds at 1 degree. These field strengths are determined to a large degree by the purity of the material, the mechanical stresses, and upon the general orientation or configuration of the specimen being tested. In certain configurations niobium has been found to have a critical field strength as high as 4000 oersteds at approximately 1 degree temperature. At the present time, a popular theory explaining the phenomenon of superconductivity is that a fraction of the total population of current carrying electrons is paired in the sense that the resistance set up by the collision of one electron is precisely offset by the rebound of its partner from a simultaneous collision, so that no net resistance to the current is set up. At temperatures above the transition point or in magnetic fields of greater than critical strength these electrons become unpaired and their collisions are no longer self-canceling, but additive, and hence electrical resistance is restored.

Figure 3:
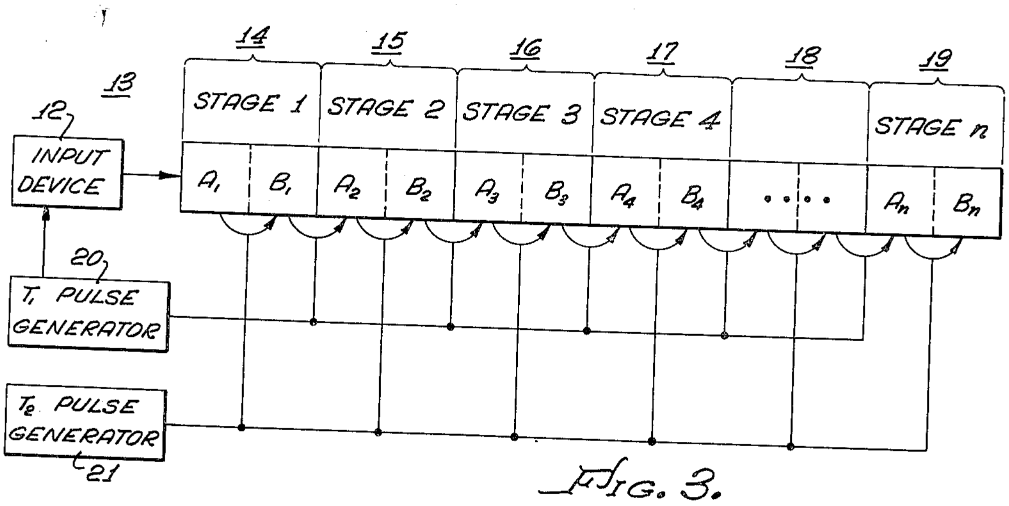
FIG. 3 is a block diagram of a superconductive shift register.

Referring now to FIG. 3, there is shown in the broadest sense an input device 12 arranged to feed a shift register 13. The shift register 13 is composed of a plurality of bit handling stages identified by reference numbers 14, 15, 16, 17, 18, and 19. Each stage is arranged to handle a single bit of information and is mechanized into two equal parts identified as an A part and a B part. The shifting of information is accomplished in two steps by the defined T1 shift and T2 shift. A T1 shift permits information to be read into the input register 13 and simultaneously shifts information from the B portion of each stage into the A portion of the next stage. A T2 shift occurs at a time after the T1 shift and in a nonoverlapping relationship thereto. The T2 shift causes information to be shifted from the A portion of any given stage into the B portion of the same stage. The pulses necessary to cause a T1 shift are generated by a T1 pulse generator 20 symbolically represented to show the control over the shifting of information from the B portion of every stage into the A portion of the next adjacent stage. A T2 pulse is generated by a T2 pulse generator 21 represented symbolically to illustrate the control over the shifting of information from the A portion to the B portion of any given stage. The pulses generated by the T1 pulse generator 20 and the T2 pulse generator 21 are substantially square wave pulses of sufficient amplitude to cause the switching action and occurring in timed relationship with respect to each other to prevent overlapping of the pulses. For continuous sequential operation, a train of pulses may be generated by each of said generators in order to cause the information to be advanced at a speed determined by the repetition rate of the pulses used. The T1 pulse generator 20 and the T2 pulse generator 21 have been illustrated as being separate in function from the input device 12 in order to describe the invention in the broadest sense. As the description progresses it will be apparent that the functions of either the T1 pulse generator 20 and the input device 12 or the functions of the T2 pulse generator 21 and the input device may be combined. The following detailed schematics illustrated in FIGS. 4, 5, 6, and 8 show a system in which the functions of the T1 shift and the input device are combined. The analogy of combining the functions of the T2 shift and the input device is completed by observing the perfect symmetry of each stage and the fact that starting with either the T1 pulse or the T2 pulse is arbitrary.

Figure 8:
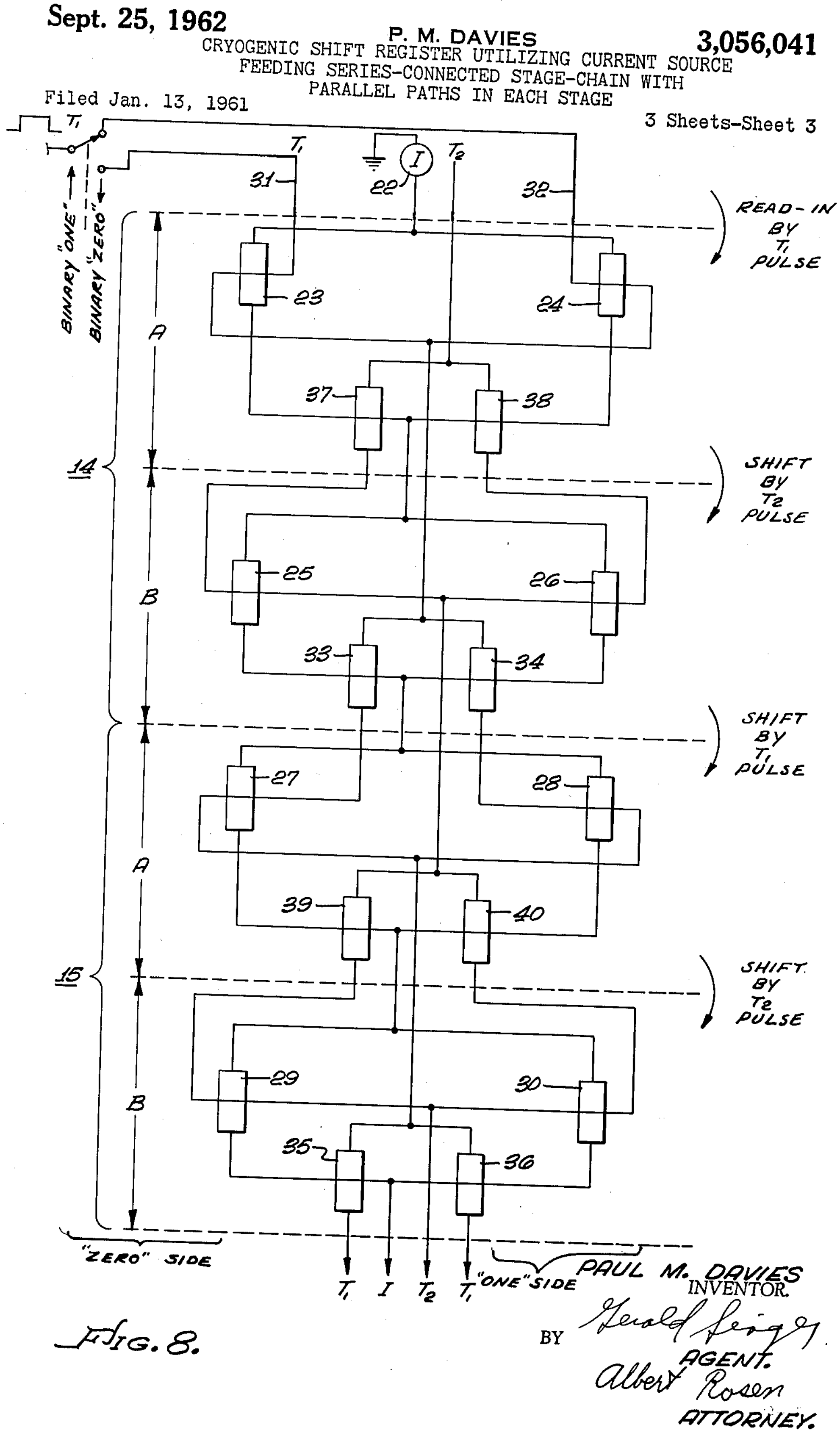
FIG. 8 is a schematic diagram of a superconductive shift register constructed according to the principles of the present invention.

In considering the specific applicability of the superconductive device as an element in the shift register, it should be remembered that information in any part A or B of any stage is represented by the occurrence of current in one branch or the other. As mentioned previously, an arbitrary convention can be chosen in which current passing through the left path will represent a binary 0 and current in the right path will represent a binary 1. The shift register is actually a composite of three separate structures, one representing the memory cells illustrated in FIG. 4, the second representing the T1 shift illustrated in FIG. 5, and the third representing the T2 shift illustrated in FIG. 6. FIG. 8 simply illustrates the composite of FIGS. 4, 5, and 6 in a single figure.

Figures 4, 5, 6:
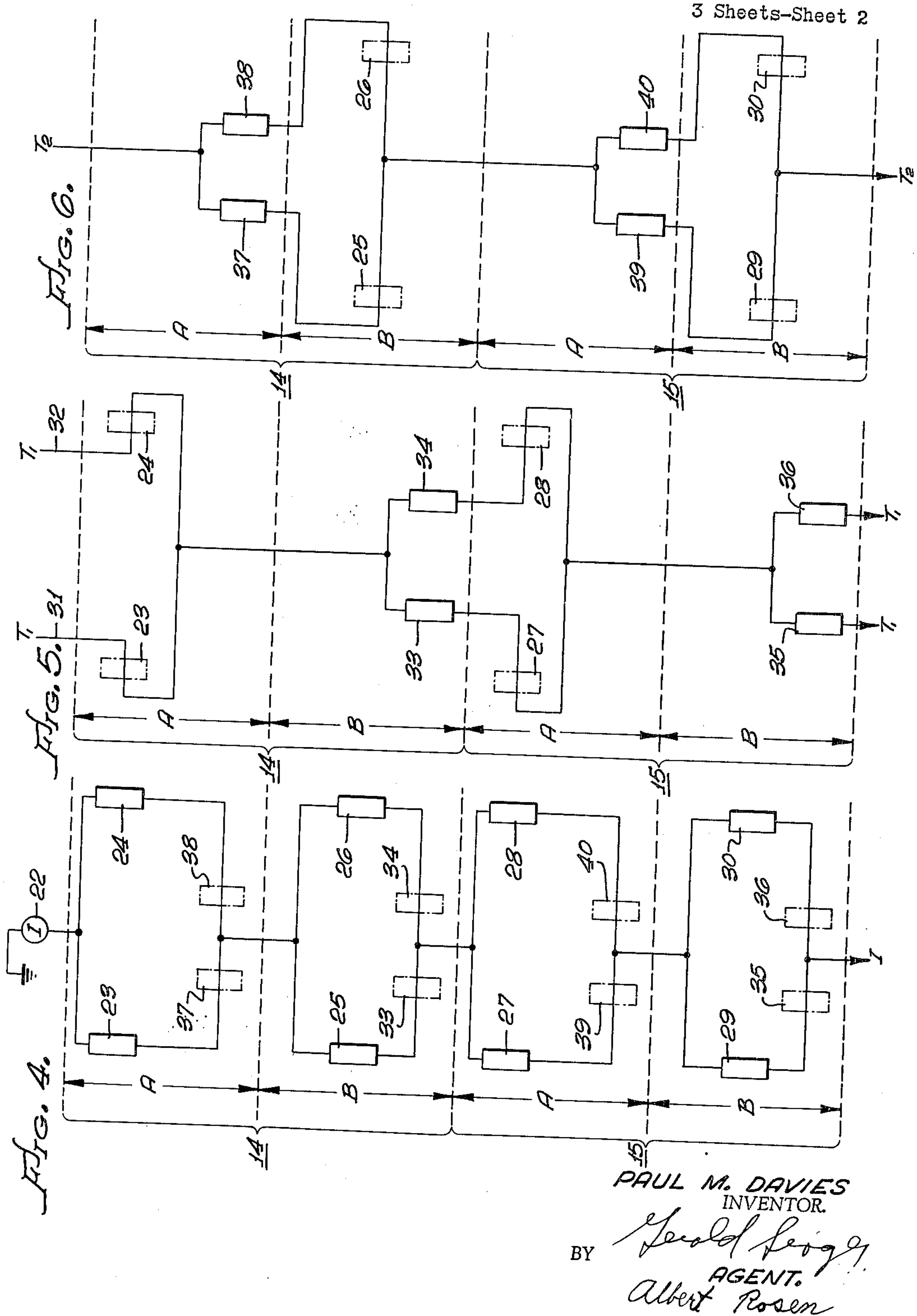
FIG. 4 is a schematic diagram illustrating the individual memory cells forming part of each stage.
FIG. 5 is a schematic diagram illustrating the T1 shift.
FIG. 6 is a schematic diagram illustrating the T2 shift.

Referring now to FIG. 4, there is shown a current source 22 connected to one end of a common connection of the gate elements of devices 23 and 24. Devices 23 and 24 are located, respectively, in the left and right hand branches of the A portion of stage 14. The other end of the gate elements of devices 23 and 24 are also connected together and connected to one end of a common connection of the gate elements of devices 25 and 26 which constitute the memory cell for the B portion of stage 14. In a similar manner, devices 27 and 28 form the basic memory cell for the A portion of stage 15, and devices 29 and 30 form the memory cell for the B portion of stage 15. Upon review, it will be apparent that all memory cells are serially connected together and that each portion of every stage is identical. The direct current from current source 22 must therefore pass through each and every portion of every stage. The information contained in each portion of each stage is determined by whether the direct current is caused to flow in the left path or the right path of its memory cell. The channeling of current from current source 22 will depend only on the initial superconductive or resistive condition of the individual devices forming the memory cell in each portion of each stage.

Refering now to FIG. 5, there is shown a mechanization of the T1 shift which causes input information to be fed into the A portion of the first stage and also shifts information from the B portion of every stage into the A portion of the next stage. The T1 pulse, as mentioned previously, is substantially a square wave and is directed on either of lines 31 or 32 depending on whether a binary 1 or binary 0 is being fed into the shift register. Lines 31 and 32 are connected, respectively, to the control elements associated with devices 23 and 24 forming the memory cell for the A portion of stage 14, and are then connected together to a junction of the gate elements of devices 33 and 34 located in the B portion of stage 14. The control elements associated with devices 33 and 34 are each respectively in the left and right hand path of the memory cell of the B portion of stage 14. The other end of the gate elements associated with devices 33 and 34 are each connected respectively to the control elements of devices 27 and 28 forming the memory cell for the A portion of stage 15. The other ends of the control elements of devices 27 and 28 are joined together and similarly are connected to a junction of the gate elements associated with devices 35 and 36 located in the B portion of stage 15. A review of both FIGS. 4 and 5 will now show the perfect symmetry existing within each half of each stage and also between stages.

Referring now to FIG. 6, there is shown the mechanism for achieving a T2 shift which, as mentioned previously, causes information to be shifted from the A portion of any given stage into the B portion of the same stage. The T2 pulse is fed into one end of a junction of the gate elements associated with devices 37 and 38 both located in the A portion of stage 14 and having their respective control elements in the left and right hand paths of the memory cell of said stage. The gate elements of device 37 and device 38 are respectively connected to the control elements of devices 25 and 26 forming the memory cell for the B portion of stage 14. The other end of the control elements of devices 25 and 26 are connected together and form the T2 input for the A portion of stage 15. The A portion of stage 15 is identical with the A portion of stage 14 and includes devices 39 and 40. The gate elements of devices 39 and 40 are respectively connected to the control elements of devices 29 and 30 forming the memory cell for the B portion of stage 15 in a similar manner as just described for the B portion of stage 14.

Figure 7:
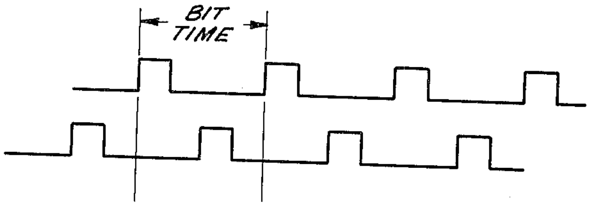
FIG. 7 is a graph illustrating the timed relationship existing between the T1 shift pulses and the T2 shift pulses.

FIG. 7 illustrates the basic shape of the T1 and the T2 pulse trains and the time relation that must exist between said pulse trains. The graph shows that a single bit is advanced to the next stage only after both a T1 pulse and a T2 pulse.

As mentioned previously, FIG. 8 is the actual circuit diagram of the shift register and incorporates the memory cells illustrated in FIG. 4, the T1 shift illustrated in FIG. 5, and the T2 shift illustrated in FIG. 6. In order to understand the shifting of the information contained in each memory cell, it must be remembered that the binary information is represented by the path of current flow in each memory cell. Since each cell presents two possible paths for this current flow, the selection of either the left path or the right path will determine whether a binary 0 or a binary 1 is stored in the cell. As mentioned in connection with FIG. 7, a single bit time must by definition include a T2 pulse and a T1 pulse occurring sequentially and in a nonoverlapping condition.

The shifting of information will be more easily understood if an example is described in which a binary 0 then a binary 1 are entered and shifted through the register. Information is entered into the register from an external input flip-flop which controls gates in lines 31 and 32. A binary 0 is entered by causing the gate in line 31 to become resistive, thereby directing the T1 pulse current through line 32. As a result, the direct current from source 22 will therefore flow through the superconductive device 23 indicating a binary 0 and then serially through all the other stages. In connection with superconductive devices, it was discovered that after the original T1 pulse setting up the current path has been removed, the direct current distribution in the individual memory cells will remain unchanged due to the finite inductance and zero resistance of each path. As a result, this will insure that the currents as originally set up will continue to flow in the originally determined path until a finite change in resistance causes a change in the flow path of the current. This ability of the direct current to remain in the last given path regardless of the fact that both paths are superconductive allows the shift register to remember the information originally stored in it over any period of time. Since the direct current from source 22 is flowing through device 23, it will be apparent that device 37 will become resistive thereby causing a subsequent T2 pulse to flow through device 38. The T2 pulse flowing through the gate element of device 38 and the control element of device 26 will cause device 26 to become resistive. The direct current path from source 22 now includes device 23 and device 25, indicating that the binary 0 originally located in the A portion of stage 14 is now in the B portion of said stage.

A new bit handling cycle is started with a T1 shift, and according to the original example a binary 1 will be introduced as evidenced by the T1 pulse appearing on line 31, causing device 23 to be switched resistive. The direct current will now flow through the gate element of device 24 indicating that a binary 1 is now stored in the A portion of stage 14. Since the direct current is flowing through device 25, it can be seen that device 33 will be resistive and the T1 pulse will flow through device 34 and the control element of device 28, thereby making device 28 resistive. The direct current now passes through the gate element of device 25 as before with no change and through the gate element of device 27 and the control element of device 39, thereby causing device 39 to become resistive. The effect of this T1 pulse, therefore, is to introduce a binary 1 into the A portion of stage 14 and to transfer the binary 0 previously located in the B portion of stage 14 into the A portion of stage 15.

A subsequent T2 pulse will flow through device 37, since device 38 was made resistive by the direct current flowing through device 24. The T2 pulse path will therefore include device 37, and the control element of device 25, causing device 25 to become resistive. The T2 pulse will continue through device 40 and the control element of device 30, thereby causing device 30 to become resistive. The direct current path will therefore include device 24, device 26, device 27, and device 29, indicating that the binary 1 in the A portion of stage 14 was shifted to the B portion of said stage, and that the binary 0 in the A portion of stage 15 was shifted to the B portion of the same stage.

The output of the shift register may be achieved by using either a T1 or T2 shift controlled by the final memory cell of the register to in turn control the input gates of an external flip-flop. It will be apparent to those skilled in the art that numerous adaptations of the shift register may be made. For example, the output may be fed to the input thereby creating a circulating register. In addition, additional control gates may be added to the memory cell to permit the parallel loading of information into the shift register prior to shifting. Similarly, additional controls may be added to the memory cells to permit parallel output from the register. By these techniques the shift register may be used as a parallel to serial and as a serial to parallel converter.

This completes the embodiment of the invention illustrated herein; however, many modifications and advantages thereof will be apparent to persons skilled in the art without departing from the spirit and scope of this invention. For example, the crossed film cryogenic elements illustrated and described in the preferred embodiment may easily be replaced by those of the so-called parallel film cryogenic devices. Accordingly, it is desired that this invention not be limited to the particular details of the embodiment disclosed herein except as defined by the appended claims.

The embodiments of the invention in which an exclusive property or privilege is claimed are defined as follows:

1. In combination, a plurality of serially connected memory cells, each memory cell comprising a pair of selectively controlled paths connected together to define a first current path and a second current path whereby current flowing in said first path represents a binary 1 and current flowing in said second path represents a binary 0, means for entering information into the first of said serially connected memory cells, means in every even numbered memory cell responsive to the information in said memory cell for transferring only said information into the next higher odd numbered memory cell, and means in every odd numbered memory cell responsive to the information in said memory cell for transferring only said information into the next higher even numbered memory cell.

2. In combination, a plurality of serially connected memory cells, each memory cell comprising a pair of superconductive devices connected together to define a first current path and a second current path whereby current flowing in said first path represents a binary 1 and current flowing in said second path represents a binary 0, means for entering information into the first of said serially connected memory cells, means in every even numbered memory cell responsive to the information in said memory cell for transferring only said information into the next higher odd numbered memory cell, and means in every odd numbered memory cell responsive to the information in said memory cell for transferring only said information into the next higher even numbered memory cell.

3. In combination, a plurality of serially connected memory cells, each memory cell comprising a pair of superconductive devices connected together to define a first current path and a second current path whereby current flowing in said first path represents a binary 1 and current flowing in said second path represents a binary 0, means for entering information into the first of said serially connected memory cells, controllable means in each memory cell responsive to the selected current path in said memory cell for selecting the same current path in the next adjacent higher order memory cell, means for energizing said controllable means located in every even numbered memory cell whereby information from every even numbered memory cell is transferred into said next higher odd numbered memory cell, and means for energizing said controllable means located in every odd numbered memory cell whereby information from every odd numbered memory cell is transferred into said next higher even numbered memory cell.

4. In combination, a plurality of serially connected memory cells, each memory cell comprising a first and second superconducting device having their gate elements connected in parallel whereby current flowing in said first gate element represents a binary 1 and current flowing in said second gate element represents a binary 0, each of said devices having a control element adapted to be controlled whereby either said first or said second gate element is selected for the current path, means for entering information into either of said first or second control elements of the first of said serially connected memory cells, controllable means in each memory cell responsive to the selected current path in said memory cell for selecting the same current path in the next adjacent higher order memory cell, means for energizing said controllable means located in every even numbered memory cell whereby information from every even numbered memory cell is transferred into said next higher odd numbered memory cell, and means for energizing said controllable means located in every odd numbered memory cell whereby information from every odd numbered memory cell is transferred into said next higher even numbered memory cell.

5. In combination, a plurality of serially connected memory cells, each memory cell comprising a pair of superconductive devices connected together to define a first current path and a second current path whereby current flowing in said first path represents a binary 1 and current flowing in said second path represents a binary 0, means for entering information into the first of said serially connected memory cells, controllable means in each memory cell comprising a first and second superconductive device, the control elements of each of said superconductive devices being connected respectively in said first path and said second path of said memory cell, the gate element associated with said first device being connected to the control element of one of the devices comprising the memory cell in the next higher order memory cell, the gate element associated with said second device being connected to the control element of the second of the devices comprising the same next higher order memory cell, means for energizing said controllable means located in every even numbered memory cell whereby information from every even numbered memory cell is transferred into said next higher odd numbered memory cell, and means for energizing said controllable means located in every odd numbered memory cell whereby information from every odd numbered memory cell is transferred into said next higher even numbered memory cell.

6. In combination, a plurality of serially connected memory cells, each memory cell comprising a pair of superconductive devices connected together to define a first current path and a second current path whereby current flowing in said first path represents a binary 1 and current flowing in said second path represents a binary 0, means for entering information into the first of said serially connected memory cells, controllable means in each memory cell responsive to the selected current path in said memory cell for selecting the same current path in the next adjacent higher order memory cell, means for energizing said controllable means located in every even numbered memory cell with a first shifting pulse means for energizing said controllable means located in every even numbered memory cell whereby information from every even numbered memory cell is transferred into said next higher odd numbered memory cell, and means for energizing said controllable means located in every odd numbered memory cell with a second shifting pulse means for energizing said controllable means located in every even numbered memory cell whereby information from every odd numbered memory cell is transferred into said next higher even numbered memory cell.

7. In combination, a plurality of serially connected memory cells, each memory cell comprising a first and second superconducting device having their gate elements connected in parallel whereby current flowing in said first gate element represents a binary 1 and current flowing in said second gate element represents a binary 0, each of said devices having a controllable control element whereby either said first or said second gate element is selected for the current path, means for entering information into either of said first or second control elements of the first of said serially connected memory cells, controllable means in each memory cell comprising a first and second superconductive device, the control elements of each of said superconductive devices being connected respectively in said first path and said second path of said memory cell, the gate element associated with said first device being connected to the control element of one of the devices comprising the memory cell in the next higher order memory cell, the gate element associated with said second device being connected to the control element of the second of the devices comprising the same next higher order memory cell, means for energizing said controllable means located in every even numbered memory cell with a first shifting pulse means for energizing said controllable means located in every even numbered memory cell whereby information from every even numbered memory cell is transferred into said next higher odd numbered memory cell, and means for energizing said controllable means located in every odd numbered memory cell with a second shifting pulse means for energizing said controllable means located in every even numbered memory cell whereby information from every odd numbered memory cell is transferred into said next higher even numbered memory cell.

References Cited in the file of this patent

UNITED STATES PATENTS

| | | |
|---|---|---|
| 3,019,349 | Sanborn | Jan. 30, 1962 |
| 3,021,439 | Anderson | Feb. 13, 1962 |